United States Patent [19]

Charransol et al.

[11] 3,891,807

[45] June 24, 1975

[54] ELECTRONIC SWITCHING MODULE

[75] Inventors: Pierre Charransol; Jacques Hauri; Claude Athenes, all of Paris, France

[73] Assignee: International Standard Electric Corporation, New York, N.Y.

[22] Filed: May 9, 1973

[21] Appl. No.: 358,628

[30] Foreign Application Priority Data

May 9, 1972 France .............................. 72.16447

[52] U.S. Cl....... 179/15 BS; 179/15 AQ; 179/18 GF

[51] Int. Cl. .............................................. H04j 3/06

[58] Field of Search...... 179/18 GF, 15 AQ, 15 AT, 179/15 BS; 178/69.5 R

[56] References Cited

UNITED STATES PATENTS

| | | | |
|---|---|---|---|
| 3,446,917 | 5/1969 | Inose | 179/15 AQ |
| 3,550,088 | 12/1970 | Jones | 179/18 GF UX |
| 3,585,310 | 6/1971 | Gueldenpfennig | 179/18 GF |
| 3,715,505 | 2/1973 | Gordon | 179/18 GF X |
| 3,740,479 | 6/1973 | Green | 179/15 AQ |
| 3,754,100 | 8/1973 | Jacob | 179/15 AQ |
| 3,773,980 | 11/1973 | Pedersen | 179/15 AQ |

*Primary Examiner*—David L. Stewart
*Attorney, Agent, or Firm*—James B. Raden; D. P. Warner

[57] ABSTRACT

An electronic switching module includes memory stages at each input and/or each output for receiving data signals to be switched during a short term interval, for storing the data and then for holding it during a relatively long fraction of the channel time slot. This procedure enables the module to disassociate the reception of data from signal retransmission and enables stepping the data step by step and stage by stage.

4 Claims, 8 Drawing Figures

ELECTRONIC SWITCHING MODULE

BACKGROUND OF THE INVENTION

1. Field of the Invention

The present invention relates to an electronic switching module of use in telephone exchanges for switching time division or pulse code modulation signals.

2. Description of the Prior Art

At the inputs of an exemplary exchange, the signals originating from the lines in operation are sampled at 8 kHz and each sample results in an 8-bit coded combination. Each combination is transmitted in parallel along eight conductors, during a very short time interval, making up a channel time slot. In a particular example it is possible to time multiplex 256 paths per channel, considering that the length of a channel is 125 $\mu$s, and the duration of each of the 256 time slots is chosen as slightly less than 500 ns. In such an embodiment an incoming multiplex group can rout signals originating from 256 lines. A similar outgoing multiplex group can rout signals intended for those same 256 lines.

Inside the exchange there will generally exist several ingoing and outgoing multiplex groups. It is necessary that a coded combination appearing in a time channel of a multiplex group be retransmitted in any time channel of any multiplex group. This implies spatial switching operations (group to group connections) and time division switching operations (path to path connections). These latter will be performed by means of a network that would comprise space switches and memories. The said network could, for instance, be of the so-called space-time-space type. A routing between one incoming channel, of a first line, and one outgoing channel of a second line employs two space switches placed, as it were, on either side of a memory cell; they give it access, the one to the incoming multiplex groups the other one to the outgoing multiplex groups.

The space switches used in such an application are necessarily electronic, a connection being requested about every 500 ns. It is of course desirable that they be compact, which will contribute to the speed of operation and, that they should have only little thermic dissipation, which also will favor compactness. It, of course, is necessary that their cost be as low as possible.

Present engineering suggests then that integrated circuits which have field-effect components be used. Indeed, 16 input and one output multiplexers of this type are already well-known. One of the 16 inputs designated by a 4-bit coded combination can be connected, in very short time, to the single output. One input and 16 output demultiplexers are also well known. Such a solution, though it is not without interest, is not exactly adaptable to the requirements of switching exchanges. Namely, the fact can be criticized that it may be necessary to utilize two types of circuits (multiplexers and demultiplexers) in order to realize the input and output space switches. On the other hand, the number of connections (16 inputs, one output, four inputs, for the coded identity of the input — without counting the current-supply connections) is relatively a high number with respect to the switching operations being performed by one circuit. It is quite impossible to consider utilizing a multiplexer, or a demultiplexer, of less than 16 accesses as, otherwise, the cost price per switching point will have to be increased without any benefit.

The above explanation brings into evidence therefore the fact that an electronic switching module realized, preferably, in the form of an integrated circuit with field effect components will assure a combination of desirable characteristics including: high speed of operation, compactness, and low power consumption, for a relatively low cost.

An application for a patent No. 71 43195, filed on Dec. 2, 1971, in the name of "Compagnie Generale de Constructions Telephoniques" entitled "Module de Commutation Electronique" (Electronic Switching Module) corresponding to U.S. patent application Ser. No. 308,295 filed on Nov. 20, 1972, describes a module of that type specially adapted to the necessities of telephone switching systems and, more generally, to the necessities of any digital-signal switching system. This eight input and eight output module enables the realization of a single or multiple stage spatial network. Yet, if the use of several stages for a given number of inputs and outputs enables a reduction in the number of crosspoints, it increases the number of modules to be crossed and therefore increases the time of transmission. In the above described module, information propagation between the input and the output takes up more than half the channel time slot. It is therefore excluded that the transmission through several stages of this type might be performed within said time slot; so that the module may practically be used in a single stage network only.

BRIEF DESCRIPTION OF THE INVENTION

The present invention affords a solution to the foregoing difficulties and particularly relates to a switching module for a multiple-stage network. Embodiments of the invention enable a stage-by-stage mode of transmission and remove the limitations as to the number of stages.

The present invention has for an object to realize a switching module in the form of an integrated circuit incorporating accesses, or outputs, of a first type, and accesses, or inputs, of a second type. Switching circuits enable connections of each of these outputs to one of the inputs, for the selective transmission of a data signal, and include, in association with each access of one type at least, a memory-circuit stage provided to receive the data signal during a relatively short time interval, to store it and then to hold it during a relatively long fraction of the channel time slot. This disassociates the reception of the data-signal from retransmission and thus enables stepping the data signal step by step and stage by stage.

The switching module may be more precisely characterized by stating that it comprises, associated with each input, an input memory stage made up of at least one input switching unit, connected in series with a memory stage, arranged in such a way that when the input switching unit is closed, the memory stage receives an input data signal, stores it and retransmits it to the switching circuits of the module; and then, when the input switching unit is open, the memory stage continues transmitting the stored data signal to the switching circuits of the module.

Another feature of this switching module is the fact that it comprises, associated with each output, an output memory stage composed of at least one output switching unit, connected in series with a memory stage, as well as of at least one current-supply switching unit controlling the memory stage, arranged so that, in a first time the output switching unit being closed and the current supply switching unit open, a data signal provided by the switching circuits of the module is stored by the memory stage whose output is not connected, and then, in a second time, the out-put switching unit being open and the supply switching unit closed, the previously stored data signal is transmitted on the output onto the outside of the module, without any risk of perturbation by the internal signals of the module.

Another feature of this switching module is the fact that it comprises, associated with each output, an output memory stage made up namely of at least one output switching unit connected in series with a memory stage as well as at least one blocking switch unit connected in parallel to the input of the memory stage, arranged such that in a first time, the output switching unit being open and the blocking switch unit closed, the memory stage is blocked and its output is then isolated; whereas in a second t me, the output switching unit being closed and the blocking switch unit being open, the memory stage will receive, store and retransmit on its output onto the outside of the module, the data signal provided by the switching circuits; and, in a third time, the output switching unit being open whereas the blocking switch unit remains open, the memory output stage is isolated from the switching circuits and continues providing, onto the outside of the module, the previously stored data signal.

BRIEF DESCRIPTION OF THE DRAWINGS

Different other features of the invention will become apparent from the description that follows, given by way of non-limiting example, in conjunction with the accompanying drawings comprising:

First will be described here, in referring to FIG. 1, the diagram of the circuits of a switching module designed conformably to present invention. FIG. 2 will also be referred to, which shows curves illustrating the control signals of the circuits in FIG. 1.

Figure 1:
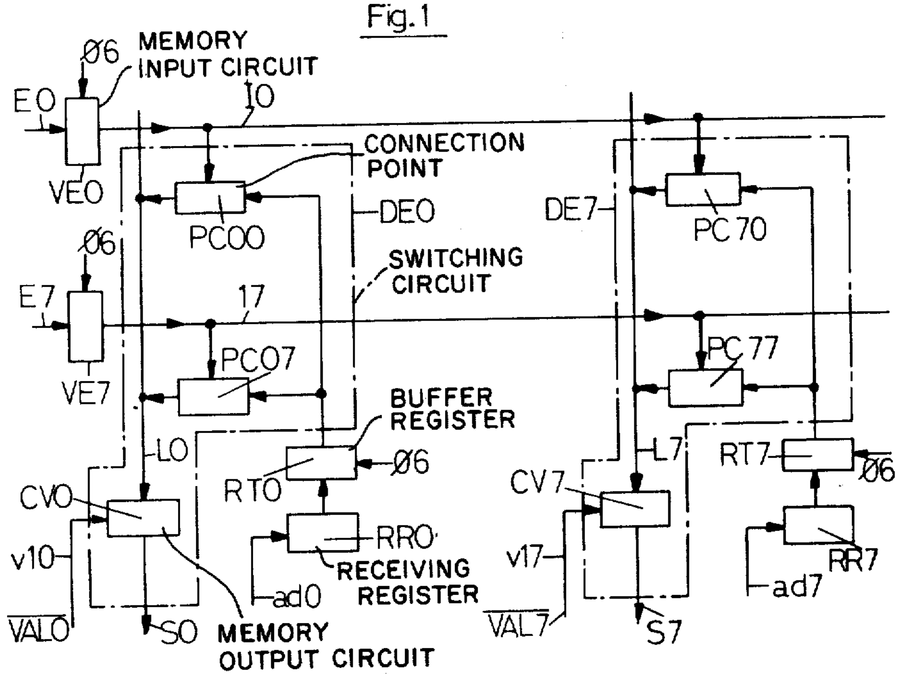
FIG. 1, the block diagram of the circuits of a switching module realized conformably to the present invention.

The switching module in FIG. 1 comprises essentially eight inputs E0 to E7, eight outputs S0 to S7 and eight switching circuits DE0 to DE7 comprising each eight connection points PC00 to PC07, PC70 to PC77. In order to simplify the figure, only the first input and the last input, the first output and the last output, and the corresponding switching circuits, are shown.

The input E0 is associated with a memory input circuit VE0 controlled by a phase signal 06. When this signal is present, the input circuit VE0 stores on its input the information that it receives. When this phase signal 06 is removed, the memory input circuit VE0 maintains on the input conductor I0 the previously stored information.

Input E7 is likewise provided with a memory input circuit VE7 which controls the conductor I7 in accordance with the information stored under the influence of the phase signal 06. Same applies to the inputs not shown on the figure.

Output S0 is associated with a memory output circuit CV0 controlled by a strobe signal $\overline{\text{VAL0}}$ applied to a strobe conductor *v*10. When signal $\overline{\text{VAL0}}$ is present, the output circuit CV0 stores the information transmitted by one of the connection points PC00 to PC07 along the column conductor L0. When signal $\overline{\text{VAL0}}$ is removed, the output circuit CV0 transmits the information along the output conductor S0.

Output S0 is also associated with : an address conductor *ad*0, provided for the reception of a three bit address transmitted in series and designating an input to which the output must be connected; a receiving register RR0 which receives these three bits in series and which then provides them in parallel; a buffer register RT0 receiving the three bits provided in parallel by the register RR0 and which then stores them such that the register RR0 be released in order to receive a new address.

A three bit address, transmitted in series along the conductor *ad*0, having been received by the register RR0, the transfer of that address from register RR0 to register RT0 takes place in response to the phase signal 06.

As from this instant, the address is transmitted by the register RT0 to the switching circuit DE0. It is decoded and it renders conducting a connection point, PC00 for instance. During that time, the register RR0 is available for receiving a new address.

The eight input E0 to E7 and one output S0 switching unit, constituted by the circuits RR0, RT0 and DE0 can thus establish successive connections of output S0 with the various inputs, without any interruption, inspite of the fact that the addresses are transmitted in series.

Output S7 is similarly provided with a memory output circuit CV7, intercalated between conductors L7 and S7 and controlled by a strobe signal $\overline{\text{VAL7}}$ applied to a strobe conductor *v*17, and is provided as well with registers RR7 and RT7 for the reception of an address provided along an address conductor *ad*7. Same applies to the other outputs not shown in the figure.

Thus, at the same instant 06, eight input information bits are stored by the circuits VE0 to VE7 and each register RT0 to RT7 receives a new address. In each switching circuit DE0 to DE7, the input and address information extend up to the connection points; one of them operates and provides the information selected for each column conductor. When the strobe signals $\overline{\text{VAL0}}$ to $\overline{\text{VAL7}}$ are removed, the memory output circuits CV0 to CV7 will transmit the information bits, which are present along column conductors L0 to L7, respectively, to their respective outputs S0 to S7. If it is intended to isolate an output, say S7 for instance, it is just necessary to hold the corresponding strobe signal, $\overline{\text{VAL7}}$.

Such arrangements make it possible, for instance, to constitute sixteen input and eight output switching units, by connecting in parallel the outputs (S0 to S7) and the address conductors (*ad*0 to *ad*7) of two modules which are identical to the one in FIG. 1. Each module will enable connecting a common output, S0 for instance, to a group of 8 inputs and more particularly to an input designated in the group. The corresponding strobe signal ($\overline{\text{VAL0}}$) will be removed in one of the modules only so that the common output, S0, will be connected finally to only one of the inputs in both eight input groups.

It is possible moreover to constitute an eight input and sixteen output switching unit by connecting in parallel the address conductors and the inputs of the two modules.

Now will be described, in referring to FIG. 3, the base circuit of a register stage or of a memory circuit. This circuit comprises three field effect transistors Q7, Q8 and Q9. It is controlled by a phase signal 0*i*. Transistors Q7 and Q8, constituting the memory stage, are complementary transistors permanently current-supplied between a +V positive potential and the reference potential which is the earth potential. Their gates are linked and they are controlled, when transistor Q9 operating by way of an input switching unit is conducting under the influence of the phase signal 0*i*, by the data signal present on input *ent*. This data signal charges the capacity of the gates of transistors Q7 and Q8 with respect to the substrate; this capacity is shown in the figure by a condenser *cp*3. If that data signal is positive, it renders conducting the transistor Q8; and the output conductor *cs* is connected to the reference potential, that is to say to the earth potential. If the data signal is of low level, it renders conducting the transistor Q7, and the output conductor *cs* is brought to the +V positive potential. Thus when the phase signal 0*i* is present, the data signal present upon input *ent* is stored by capacitive effect on the gates of transistors Q7 and Q8, whereas it is provided and then held, inversed, along output conductor *cs*. When signal 0*i* stops, the memory stage made up of transistors Q7 and Q8 continues transmitting the stored data signal.

Now will be described, in referring to FIG. 4, an embodiment of registers RR0 and RT0, based upon the use of the base circuit in FIG. 3. The circuit formed by the two transistors Q7 and Q8 of that circuit is shown in the figure by a rectangle, ET1 for instance; whereas input transistor, noted Q9 in FIG. 3, is explicitly indicated. It is worth noting that the same circuit, ET51 for instance, can be controlled by two independent circuits each of which is provided with a transistor of its own.

Figure 6:
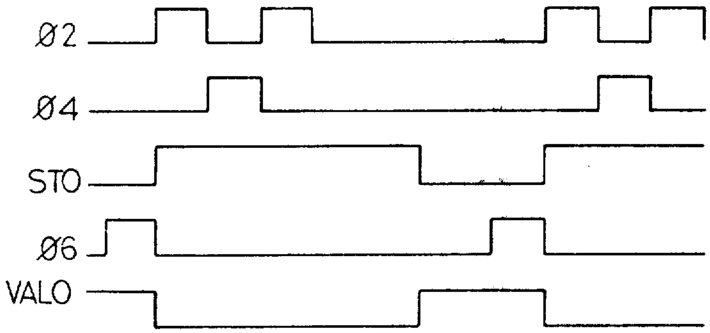
FIG. 6, curves illustrating the operation of the various elements in FIG. 5.

The various input transistors are controlled by phase signals that can be those of FIG. 6, the phase signals noted $\overline{\mathbf{06}}$ being the logic inverses of the phase signals 06.

The first bit of an address is received in the register RR0 by memory circuit ET1, in phase 02. It is stored and inversed, as was already seen above, by the circuit ET1. The second bit is received by the circuit ET4 in phase 04 whereas the first bit is transferred to memory circuit ET2. The third bit is received by memory circuit ET1 in a second phase 02. Thus, the first bit has been inversed twice and is identical to the input bit, at the output of circuit ET2, whereas the second and third bits are appearing inversed at the output of memory circuits ET1 and ET4.

During phase 06, the last received bit, provided by ET1, is transferred to a memory circuit ET51. The second inversion which takes place at this occasion cancels the first one. This bit, to be so-called *sd*2, is therefore provided, just as it was received, to the output also so-called *sd*2. Moreover, this output drives, without any phase gate, a memory circuit ET50. This chain therefore provides a bit $\overline{sd2}$, complementary of the preceding one, to output $\overline{sd2}$. This latter output, outside phase 06, that is to say in presence of signal $\overline{06}$, is coupled with the input of circuit ET51. Then this therefore is a bistable circuit, which memorizes and holds permanently the address information, whilst providing its complementary.

It is worth noting that during the presence of signal $\overline{\mathbf{06}}$, that is to say outside phase 06, the various link transistors between register RR0 and register RT0 are blocked, so then the data items stored in register RT0 are not perturbed by any possible parasitics originating from register RR0. This latter, released, is then able to receive a second address along input conductor *ad*0.

The storing of the second bit, provided by chain ET4, is identical to what has just been described above for the last bit. Bit *sd*1 and the complementary bit $\overline{sd1}$ are provided upon outputs *sd*1 and $\overline{sd1}$ respectively.

Figure 4:
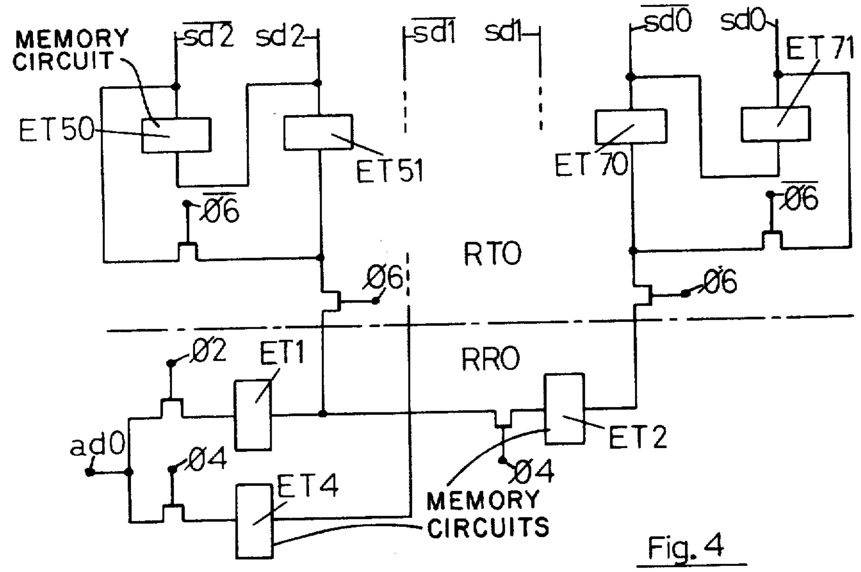
FIG. 4, diagram of the circuits of an embodiment of registers RR0 and RT0 of the module in FIG. 1.
Figure 2:
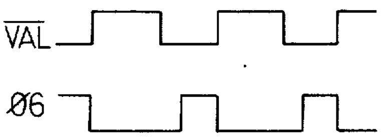
FIG. 2, curves illustrating the operation of the elements of FIG. 1.

Same applies to the first bit; yet, as is indicated in FIG. 4, the output of circuit ET2 is connected not to a circuit ET71, on the analogy of ET51, but to the circuit ET70; and this inverses the logic operation of the bistable, in order to take into account that the bit considered here has already undergone two inversions instead of one. Bit *sd*0 and the complementary bit $\overline{sd0}$ are thus provided upon outputs *sd*0 and $\overline{sd0}$ respectively.

The three bits of the address are therefore indeed provided in parallel, without inversion, to the switching circuit DE0. During that time, the register RR0 is used for receiving the address meant for the next connection.

Now will be described, in referring to FIGS. 5 and 6, an embodiment of the switching circuit DE0 in FIG. 1.

Figure 5:
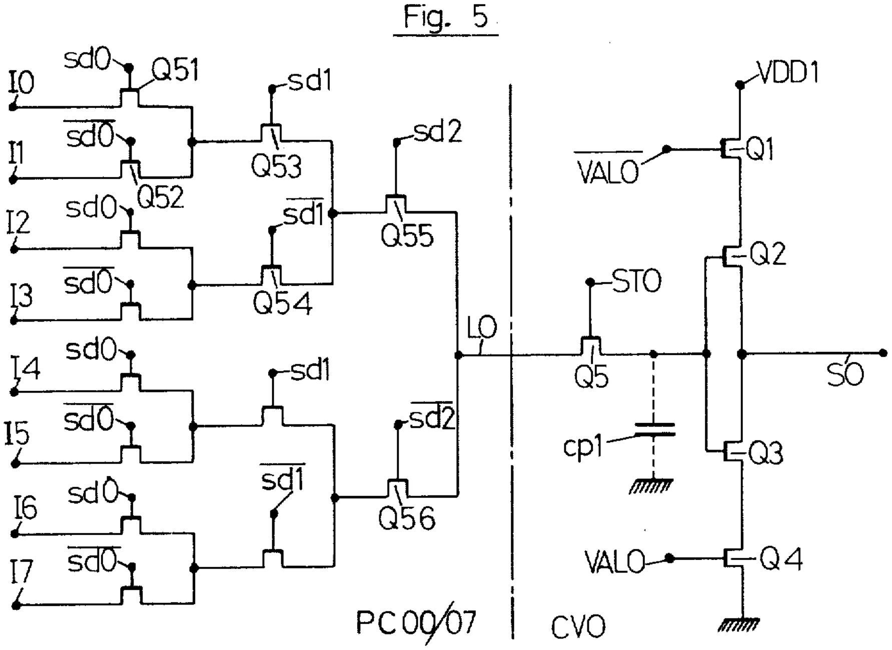
FIG. 5, the general diagram of an embodiment of the switching circuits DE0 of the module in FIG. 1.

There can be seen once more, in the switching circuit of FIG. 5, the connection points PC00 to PC07 and the memory output circuit CV0.

The connection points PC00 to PC07 are collectively realized in the form of a three-stage eight-input I0 to I7 and one output L0 decoding pyramid PC00/07. In starting from output L0, there can be found a pair of complementary field effect transistors Q55 and Q56 of the third stage controlled by the address bits *sd*2 and $\overline{sd2}$ respectively, which are provided by the register RT0 in FIG. 4. If for instance bit *sd*2 is at the logic level 1, the transistor Q55 is conducting; transistor Q56 being blocked by signal $\overline{sd2}$ at logic level 0. Output Lo is then connected to one of the two pairs of complementary field effect transistors of the second stage. It will be assumed that it is the case here of the pair which comprises transistors Q53 and Q54 controlled by bits *sd*1 and $\overline{sd1}$ respectively, and provided by register RT0 in FIG. 4. If, for instance, the address bit *sd*1 is at logic level 1, transistor Q53 is conducting, whereas transistor Q54 is blocked. Output L0 of the decoding pyramid is, under such conditions, connected to one of the four pairs of complementary transistors of the first stage. This pair is, for instance, the one which is made up of transistors Q51 and Q52 controlled by the address bits *sd*0 and $\overline{sd0}$ respectively, which are provided by the register RT0 in FIG. 4. If for instance, bit *sd*0 is at logic level 1, the transistor Q51 is conducting whereas the transistor Q52 is blocked. Output L0 of the pyramid is then connected to input I0 for an address of three bits all equal to 1. For any other combination of these three address bits, output L0 of the pyramid is connected to one of the eight inputs I0 to I7.

Thus, after phase 06, the three address bits are provided to the control gates of the transistors of the decoding pyramid PC00/07 whereas the inputs I0 to I7 will receive from the input memory circuits VE0 to VE7 the information to be switched. The information received along input conductor I0 is transmitted onto output L0 of the pyramid and therefore onto input of the output memory circuit CV0.

Figure 3:
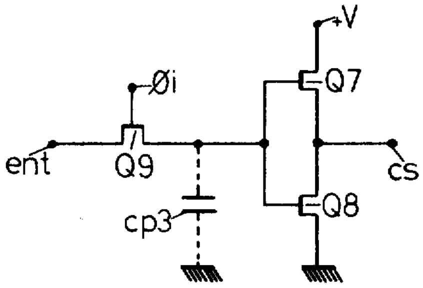
Fig. 3 PRIOR ART
FIG. 3, a schematic diagram of a well-known type of a field-effect-transistor shift register stage.

The output memory circuit CV0 is a circuit derived from the memory circuit in FIG. 3. It comprises a field effect transistor Q5 operating as an output switching as an output switching unit and controlled by a storing signal ST0, a pair of field effect transistors Q1 and Q2 connected in series to a pair of transistors Q3 and Q4 complementary to the preceding ones. These four transistors are permanently current-supplied between a positive potential VDD1 and the reference potential which is the earth potential. The gates of transistors Q2 and Q3 are linked and controlled, when transistor Q5 is conducting under influence of signal ST0, by the data signal present along conductor L0. This data signal charges the capacity of the gates of transistors Q2 and Q3 with respect to the substrate; this capacity is shown in the figure by a condenser *cp*1. Transistor Q1 is controlled by a strobe signal $\overline{\text{VAL0}}$; and, the complementary transistor Q4 is controlled by the complementary signal VAL0.

The charge voltage of the capacity *cp*1 is provided to the gates of transistors Q2 and Q3 constituting the memory stage. In the absence of the strobe signal $\overline{\text{VAL0}}$ and therefore in the presence of signal VAL0, transistors Q1 and Q4 constituting a current-supply switching unit are conducting, and this leads back to the case in FIG. 3: if the charge voltage is positive, it renders conducting the transistor Q3, and, output S0 is connected to the earth potential; if the charge voltage of capacity *cp*1 is negative, transistor Q2 is conducting and output So is connected to the positive potential VDD1.

Thus, as is shown by the curves of FIG. 6, in phase 06 an information to be switched is provided to each of the input conductors I0 to I7 and the three address bits as well as the complementary bits are provided to the connection points PC00 to PC07 by the register RT0. The data signal extends then in the decoding pyramid PC00/07. The phase signal 06 is removed but the data and address signals are maintained by memorization; the memorization signal ST0 is applied to transistor Q5 which is then rendered conducting. Capacitor *cp*1 is then charged by the data signal. The memorization signal ST0 has a duration equal at least to the time necessary for the data signal to extend in the decoding pyramid and for the effective charge of the capacity *cp*1.

The memorization signal ST0 stops then; the transistor Q5 is blocked. Consequently, the charge voltage of the capacity *cp*1 is made independent of any possible fluctuations of the output signal of the decoding pyramid. At the removal of the strobe signal $\overline{\text{VAL0}}$ that is to say at the appearing of signal VAL0 as was already seen above, the data signal, according as to whether it is of logic level 0 or of logic level 1, renders conducting transistor Q2 or Q3 and the output S0 receives an inversed signal.

The phase signal 06 restores to logic level 1 and the cycle repeats itself as was just described above.

It is worth noting that it is not indispensable that the phase signals 06 and VAL0 should be removed at the appearing of the memorization signal ST0 as is shown in FIG. 6 which is only an example of representation of the signals necessary for the operation of the various elements of the module in present invention.

Figure 7:
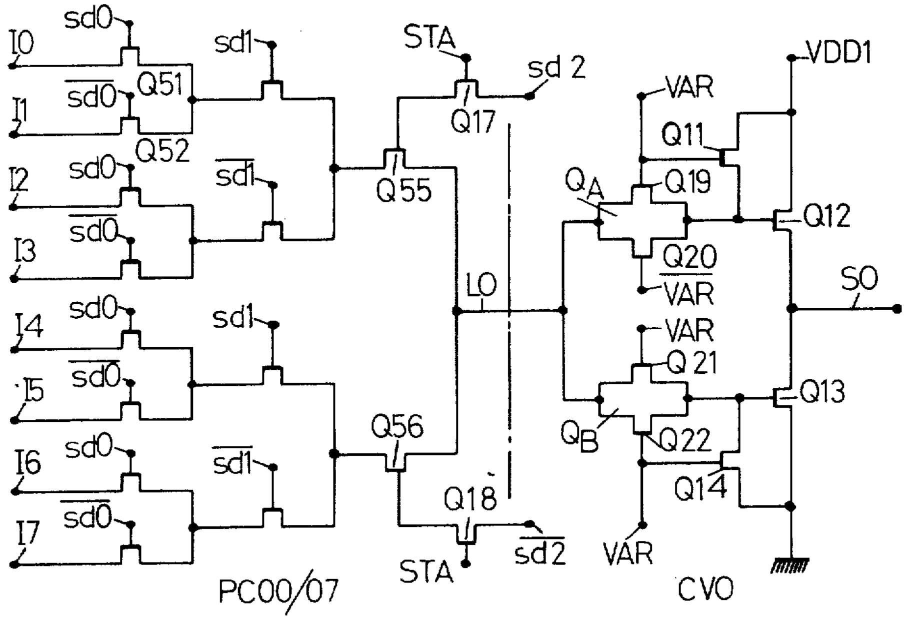
FIG. 7, a schematic diagram of a preferred embodiment of the switching circuits DE0 of the module in FIG. 1.

Now will be described, by referring to FIGS. 7 and 8, the schematic diagram of a preferred embodiment of the switching circuits DE0 of the module of FIG. 1.

In the diagram of FIG. 7 are seen again the decoding pyramid PC00/07 and the memory output stage CV0 of FIG. 5.

The decoding pyramid PC00/07 comprises, same as before, eight inputs I0 to I7, one output L0 and three field effect transistor stages. Yet, the third stage comprising the pair of complementary transistors Q55 and Q56 is controlled no longer directly by the third address bit *sd*2 and its complement $\overline{sd2}$ but through the transistors Q17 and Q18 respectively. These transistors are controlled by a signal STA which corresponds practically to the preceding signal ST0. Thus, for instance, transistor Q55 is rendered conducting when the third bit *sd*2 has the logic level 1 and is transmitted by transistor Q17 rendered conducting by the signal STA. Same as before, when signal STA is present, output L0 is connected, for instance, to input I0 if the three address signals *sd*0, *sd*1 and *sd*2 are at level 1.

It is seen that the third address bit *sd*2 must go through one more transistor than in the circuit shown in FIG. 5 before controlling the switching circuits. The delay thus created in the transmission of that bit is not prejudicial to the normal operation of the decoding pyramid; indeed, in the very same time, the information to be switched, presented to one of the eight inputs of the pyramid, has two stages to pass through before reaching the transistor of the last stage; so then, in any case, the third bit *sd*2 of the address and its complement $\overline{sd2}$ will reach transistors Q55 and Q56, respectively, before the information to be switched.

The output memory stage CV0 comprises two arrangements or output switching units $Q_A$ and $Q_B$ connected in parallel. The arrangement $Q_A$ is made up of two complementary field effect transistors Q19 and Q20 controlled, respectively, by strobe signals VAR and $\overline{\text{VAR}}$. The output of arrangement $Q_A$ is connected to a field effect transistor Q12. Finally, a field effect transistor Q11 or blocking switch unit is connected in parallel to transistor Q12 and is controlled by signal VAR.

The arrangement $Q_B$ is also made up of two complementary field effect transistors Q21 and Q22 controlled by the strobe signals VAR and $\overline{\text{VAR}}$ respectively. The output of the arrangement $Q_B$ is connected to a field effect transistor Q13. A field effect transistor or blocking switch Q14 is connected in parallel to transistor Q13 and is controlled by signal $\overline{\text{VAR}}$.

Transistors Q12 and Q13 making up the memory stage are complementary transistors current-supplied permanently between a positive potential VDD1 and a reference potential which is the earth potential.

Figure 8:
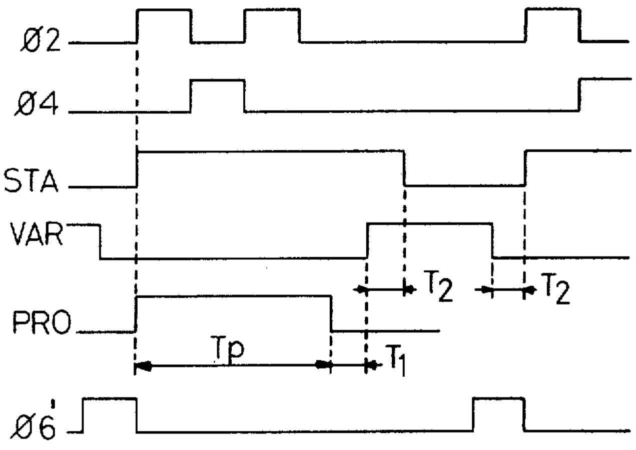
FIG. 8, curves illustrating the operation of the various elements in FIG. 7.

In FIG. 8 a curve PR0 is shown defining the propagation time Tp of the input information in the decoding circuits. The signal STA is at logic level 1 during the entire time interval $T_p$. During that time, the signal VAR is at logic level 0. Transistors Q19 and Q21 are then blocked as well as transistors Q20 and Q22. Transistor Q11 is rendered conducting. It will therefore restore the positive voltage VDD1 to the gate of transistor Q12 thus holding it in blocked condition. Likewise, transistor Q14 is rendered conducting and restors the reference potential to the gate of transistor Q13 which is thus held in blocked condition. Output S0 of stage CV0 is therefore isolated from output conductor L0 of the decoding pyramid PC00/07 and is not biased.

After a holding time $T_1$, the information to be switched being present along conductor L0. the signal VAR passes onto logic level 1. Transistors Q19 and Q21 are rendered conducting as well as transistors Q20 and Q22. Transistors Q11 and Q14 are blocked. If the data signal present along L0 is at logic level 0, it is transmitted by transistor Q19 to the gate of transistor Q12 and by the transistor Q21 to the gate of transistor Q13. This signal renders the transistor Q12 conducting the holds in blocked condition the transistor Q13. Output S0 is then connected to positive voltage VDD1.

If the data signal present along L0 is at logic level 1, it is transmitted by transistor Q20 to the gate of transistor Q12 and by the transistor Q22 to the gate of transistor Q13. This signal renders the transistor Q13 conducting and holds in blocked condition the transistor Q12. Output S0 is then connected to the reference voltage.

After a time interval $T_2$, signal STA stops. Transistors Q17 and Q18 are blocked as well as, consequently, the transistors Q55 and Q56. The output conductor L0 is now isolated from the decoding pyramid. This is without any effect upon the voltage present at the output S0. Indeed, the time interval $T_2$ is long enough to allow the data signal to charge the gates of transistors Q12 and Q13.

Signal VAR is then removed. Transistors Q19 and Q21 are blocked as well as transistors Q20 and Q22. Transistors Q11 and Q14 are rendered conducting and, same as before, they put into blocked condition transistors Q12 and Q13. Output S0 is not biased. After a time interval $T_2$, at the same time as an impulse 06, the signal STA appears and the cycle repeats itself as was described above.

It is worth noting that the output conductor S0 is separated from the potential source VDD1 or from the earth potential by only one transistor. The result is that the conductor S0, when one of these transistors is rendered conducting, is connected to a voltage nearer to VDD1, or to the earth potential, and less perturbed than the voltage transmitted to the output conductor S0 of the circuit in FIG. 5. Indeed, in that latter circuit the output conductor is connected to one of the voltages, already mentioned above, through two transistors which are neither short-circuits nor perfect circuit cuts.

It is also worth noting that signal STA is the logic inverse of signal VAR shifted in the time of an interval $T_2$. This time interval $T_2$ is of the length of the propagation time through an inverting circuit of the type of the circuit shown in FIG. 3, the input transistor Q9 being removed. Thus, it will be possible to easily obtain the signal STA at the output of that circuit to which is being supplied upon its input *ent*, the signal VAR.

It is understood the foregoing description of a specific embodiment of this invention is made by way of non-limiting example only and is not to be considered as a limitation on its scope. The numerical details, namely, are only given in order to make easier the understanding of present invention, and they may vary according to its application.

We claim:

1. A switching module for time division multiplex signals comprising: a plurality of first circuits including switching means of a first type forming inputs; a plurality of second circuits including switching means of a second type forming outputs; multistage switching circuits for connecting each of the inputs to any one of the outputs for the selective transmission of data signals; said first circuits including an input memory stage for receiving a data signal during a relatively short time interval corresponding to a relatively short fraction of a channel time slot and thereafter storing it and holding it during a relatively long fraction of a channel time slot; said input memory stage thereby disassociating reception of the data signal from retransmission and preparing the data signal to be connected step-by-step and stage-by-stage through the multi-stage switching circuits to the outputs.

2. A switching module as claimed in claim 1, in which said input memory stage includes at least one input switch connected in series with the memory stage and arranged so that when the input switch is closed the memory stage receives an input data signal, stores it and retransmits it to the switching circuits of the module; said memory stage including means operable, when the input is open, to continue transmitting the stored data signal to the multi-stage switching circuits of the module.

3. A switching module as claimed in claim 1, in which an output memory stage is associated with each output, said output memory stage including one output switch connected in series with output the memory stage; a current-supply switching unit controlling the memory stage in a first period of time during which the output switch is closed and the current-supply switching unit is open and a data signal, provided by the switching circuits of the module, is stored by the memory stage; and then in a second period of time, the output switching unit is open and the current-supply switching unit is closed and the data signal previously stored is transmitted to the output and outside of the module without risk of perturbation by the internal signals of the module.

4. A switching module as claimed in claim 1, in which each output includes an output memory stage; said multi-stage switching circuits are connected in series with the output memory stage; at least one blocking switch unit is connected in parallel to the memory-stage input during a first period of time while the output memory-stage is open and the blocking switch-unit is closed, the memory stage is blocked and its output is isolated; whereas, in a second period of time, the output switching-unit being closed and the blocking switch-unit being open, the memory stage receives, stores and retransmits on its output, onto the outside of the module, the data signal provided by the switching circuits; and, in a third period of time, the output switch being open whereas the blocking switch unit remains open, the output memory stage is isolated from the switching circuits and continues providng, onto the outside of the module, the previously stored data signal.

* * * * *